(12) United States Patent
Oh et al.

(10) Patent No.: US 12,476,265 B2
(45) Date of Patent: Nov. 18, 2025

(54) FUEL CELL MEMBRANE HUMIDIFIER

(71) Applicant: KOLON INDUSTRIES, INC., Seoul (KR)

(72) Inventors: Young Seok Oh, Seoul (KR); Ah Reum Lee, Seoul (KR); Ji Yoon Lee, Seoul (KR); Kyoung Ju Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 374 days.

(21) Appl. No.: 18/254,019

(22) PCT Filed: Jan. 4, 2022

(86) PCT No.: PCT/KR2022/000047
§ 371 (c)(1),
(2) Date: May 23, 2023

(87) PCT Pub. No.: WO2022/149819
PCT Pub. Date: Jul. 14, 2022

(65) Prior Publication Data
US 2023/0411650 A1    Dec. 21, 2023

(30) Foreign Application Priority Data

Jan. 6, 2021  (KR) .................. 10-2021-0001313

(51) Int. Cl.
*H01M 8/04119* (2016.01)
(52) U.S. Cl.
CPC ................ *H01M 8/04149* (2013.01)

(58) Field of Classification Search
CPC .................................. H01M 8/04149
(Continued)

(56) References Cited

U.S. PATENT DOCUMENTS 10,658,688 B2 * 5/2020 Shinozaki ........... H01M 8/0432
10,862,144 B2   12/2020 Kim
(Continued)

FOREIGN PATENT DOCUMENTS

JP   2009-289580 A   12/2009
JP   2010-071619 A    4/2010
(Continued)

OTHER PUBLICATIONS

JP Notice of Allowance dated Jun. 21, 2024.
KR Notice of Allowance dated Apr. 26, 2024.
European Search Report dated Aug. 26, 2024.

*Primary Examiner* — Charles S Bushey
(74) *Attorney, Agent, or Firm* — Harvest IP Law, LLP (57) ABSTRACT

The present invention relates to a fuel cell membrane humidifier which can actively control the flow rate of exhaust gas flowing from a fuel cell stack according to the output condition of a fuel cell. A fuel cell membrane humidifier according to one embodiment of the present invention includes a mid-case having an inlet through which wetting gas supplied from the fuel cell stack is introduced and an outlet through which the wetting gas is discharged; a cartridge disposed inside the mid-case and accommodating a plurality of hollow fiber membranes; a bypass space formed in the space between the mid-case and the cartridge; and an active blocking member for controlling the degree of opening of the bypass space according to the temperature of the wetting gas introduced through the inlet.

12 Claims, 7 Drawing Sheets

(58) Field of Classification Search
USPC .......................................................... 261/104
See application file for complete search history.

(56) References Cited

U.S. PATENT DOCUMENTS

| | | | | |
|---|---|---|---|---|
| 10,862,145 | B2* | 12/2020 | Oh | .................... H01M 8/04149 |
| 10,950,878 | B2* | 3/2021 | Oh | .................... H01M 8/04835 |
| 11,641,021 | B2* | 5/2023 | Lee | .................... H01M 8/0485 |
| | | | | 261/44.5 |
| 11,646,431 | B2* | 5/2023 | Kim | ................ H01M 8/04104 |
| | | | | 261/105 |
| 11,831,047 | B2* | 11/2023 | Kim | ........................ F28F 27/02 |
| 2022/0181655 | A1* | 6/2022 | Ahn | ....................... B01D 63/04 |

FOREIGN PATENT DOCUMENTS

| | | |
|---|---|---|
| JP | 2019-46585 A | 3/2019 |
| KR | 20090013304 A | 2/2009 |
| KR | 20090057773 A | 6/2009 |
| KR | 20090128005 A | 12/2009 |
| KR | 2010-0074835 A | 7/2010 |
| KR | 20100108092 A | 10/2010 |
| KR | 20100131631 A | 12/2010 |
| KR | 20110001022 A | 1/2011 |
| KR | 20110006122 A | 1/2011 |
| KR | 20110006128 A | 1/2011 |
| KR | 20110021217 A | 3/2011 |
| KR | 20110026696 A | 3/2011 |
| KR | 20110063366 A | 6/2011 |
| KR | 10-1795224 B1 | 11/2017 |
| KR | 2018-01227 A | 1/2018 |
| KR | 20180001227 A | 1/2018 |
| KR | 20190138288 A | 12/2019 |
| KR | 10-2020-0017059 A | 2/2020 |
| KR | 20200017059 A | 2/2020 |
| KR | 20200055345 A | 5/2020 |
| KR | 10-2020-0107874 A | 9/2020 |
| KR | 20200107874 A | 9/2020 |
| KR | 10-2020-0122211 A | 10/2020 |
| KR | 2021-0011204 A | 2/2021 |

* cited by examiner

FIG. 1

- Prior Art -

FUEL CELL MEMBRANE HUMIDIFIER

CROSS REFERENCE TO RELATED APPLICATION(S)

This application is a National Stage of International Application No. PCT/KR2022/000047 filed on Jan. 4, 2022, claiming priority to Korean Patent Application No. 10-2021-0001313 filed on Jan. 6, 2021, the disclosures of which is incorporated herein by reference in its entirety.

TECHNICAL FIELD

The present invention relates to a fuel cell membrane humidifier capable of actively adjusting a flow rate of an off-gas flowing into the inside from a fuel cell stack depending on an output situation of a fuel cell.

BACKGROUND ART

Fuel cells are power generation cells that produce electricity through coupling between hydrogen and oxygen. The fuel cells have an advantage of being able to continuously produce electricity as long as the hydrogen and the oxygen are supplied, and having an efficiency that is about twice higher than an internal combustion engine because of no heat loss, unlike general chemical cells such as dry batteries or storage batteries.

Further, since chemical energy generated through coupling between the hydrogen and the oxygen is directly converted into electrical energy, emission of pollutants is reduced. Therefore, the fuel cells have an advantage of being environmentally friendly and being able to reduce concerns about resource depletion due to increased energy consumption.

These fuel cells are roughly classified into, for example, a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC) depending on a type of electrolyte used.

These fuel cells fundamentally operate according to the same principle, but have a difference in a type of fuel used, an operating temperature, a catalyst, an electrolyte, or the like. Among the cells, the polymer electrolyte membrane fuel cell (PEMFC) is known to be the most promising not only for small-scale stationary power generation equipment but also for transportation systems because the polymer electrolyte membrane fuel cell operates at a lower temperature than other fuel cells and can be miniaturized due to a high output density.

One of the most important factors in improving the performance of the polymer electrolyte membrane fuel cell (PEMEC) is that moisture content is maintained by supplying a certain amount or more of moisture to a polymer electrolyte membrane (or proton exchange membrane: PEM) of a membrane electrode assembly (MEA). This is because the efficiency of power generation is rapidly degraded when the polymer electrolyte membrane is dried.

Examples of a method for humidifying the polymer electrolyte membrane include 1) a bubbler humidification scheme for filling a pressure-resistant container with water and then passing a target gas through a diffuser to supply moisture, 2) a direct injection scheme for calculating a moisture supply amount required for a fuel cell reaction and directly supplying moisture to a gas flow pipe through a solenoid valve, and 3) a humidification membrane scheme for supplying moisture to a fluidized gas layer using a polymer separation membrane.

Among these, the membrane humidification scheme for humidifying a polymer electrolyte membrane by providing water vapor to air supplied to the polymer electrolyte membrane using a membrane that selectively permeates only water vapor contained in an off-gas is advantageous in that a weight and size of a humidifier can be reduced.

A selective permeable membrane used in the membrane humidification scheme is preferably a hollow fiber membrane having a large permeable area per unit volume when a module is formed. That is, when a humidifier is manufactured using hollow fiber membranes, there are advantages that high integration of the hollow fiber membranes with a large contact surface area is possible so that a fuel cell can be sufficiently humidified even with a small capacity, low-cost materials can be used, and moisture and heat contained in an off-gas discharged with a high temperature from the fuel cell can be recovered and can be reused through the humidifier.

Figure 1:
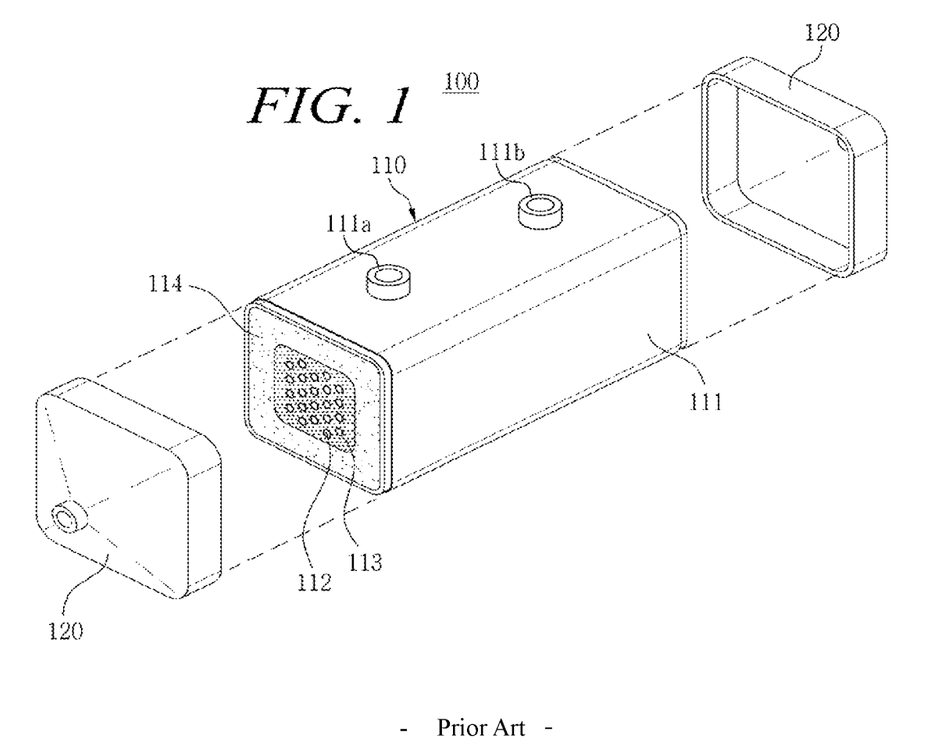
FIG. 1 is an exploded perspective view illustrating a fuel cell membrane humidifier according to the related art.

FIG. 1 is an exploded perspective view illustrating a fuel cell humidifier according to the related art. As illustrated in FIG. 1, a fuel cell humidifier 100 of the related art includes a humidification module 110 in which moisture exchange between air supplied from the outside and an off-gas discharged from a fuel cell stack (not illustrated) occurs, and caps 120 coupled to both ends of the humidification module 110.

One of the caps 120 transfers the air supplied from the outside to the humidification module 110, and the other transfers the air humidified by the humidification module 110 to the fuel cell stack.

The humidification module 110 includes a mid-case 111 having an off-gas inlet 111a and an off-gas outlet 111b, and a plurality of hollow fiber membranes 112 in the mid-case 111. Both ends of a bundle of hollow fiber membranes 112 are potted on a fixing layer 113. The fixing layer 113 is generally formed by curing a liquid polymer such as a liquid polyurethane resin through a casting scheme. The fixing layer 113 to which the ends of the hollow fiber membranes 112 are potted and a resin layer 114 between the fixing layer 113 and the mid-case 111 block internal spaces of the caps 120 from an internal space of the mid-case 111. The resin layer 114 is generally formed by curing a liquid polymer such as a liquid polyurethane resin through a casting scheme, similar to the fixing layer 113.

The air supplied from the outside flows along hollows of the hollow fiber membranes 112. The off-gas flowing into the mid-case 111 through the off-gas inlet 111a comes into contact with outer surfaces of the hollow fiber membranes 112 and then is discharged from the mid-case 111 through the off-gas outlet 111b. When the off-gas comes into contact with the outer surfaces of the hollow fiber membranes 112, moisture contained in the off-gas permeates the hollow fiber membranes 112 to humidify the air flowing along the hollows of the hollow fiber membranes 112.

DISCLOSURE

Technical Problem

An object of the present invention is to provide a fuel cell membrane humidifier capable of actively adjusting a flow rate of an off-gas flowing into the inside from a fuel cell stack depending on an output situation of a fuel cell.

Technical Solution

A fuel cell membrane humidifier according to an embodiment of the present invention includes a mid-case including an inlet through which a wetting gas supplied from a fuel cell stack flows into the inside, and an outlet through which the wetting gas is discharged; a cartridge disposed inside the mid-case and having a plurality of hollow fiber membranes accommodated therein; a bypass space formed in a space between the mid-case and the cartridge; and an active blocking member configured to adjust a degree of opening of the bypass space depending on a temperature of the wetting gas flowing into the inside through the inlet.

In the fuel cell membrane humidifier according to the embodiment of the present invention, the active blocking member may be made of a thermosensitive material capable of being compressed or expanded depending on the temperature of the wetting gas flowing into the inside through the inlet.

In the fuel cell membrane humidifier according to the embodiment of the present invention, the active blocking member may be made of a metal material expanding in a first temperature range of the wetting gas flowing into the inside through the inlet and contracting in a second temperature range lower than the first temperature range.

In the fuel cell membrane humidifier according to the embodiment of the present invention, the active blocking member may thermally expand in the first temperature range to partially block the bypass space and thermally contract in the second temperature range to partially open the bypass space.

In the fuel cell membrane humidifier according to the embodiment of the present invention, the first temperature range may be a temperature range of the wetting gas flowing into the inside through the inlet in a first output range of the fuel cell stack, and the second temperature range may be a temperature range of the wetting gas flowing into the inside through the inlet in a second output range smaller than the first output range.

The fuel cell membrane humidifier according to the embodiment of the present invention may further include: a base member for fixing the active blocking member to an inner wall of the mid-case.

A fuel cell membrane humidifier according to another embodiment of the present invention includes
a mid-case including an inlet through which a wetting gas supplied from a fuel cell stack flows into the inside, and an outlet through which the wetting gas is discharged, a plurality of accommodation holes partitioned by at least one partition member being formed in the mid-case; a plurality of cartridges disposed in the plurality of accommodation holes and having a plurality of hollow fiber membranes accommodated therein; a plurality of bypass spaces formed in a space between the mid-case and the cartridge and a space between the partition member and the cartridge; and an active blocking member configured to adjust a degree of opening of at least one of the plurality of bypass spaces depending on a temperature of the wetting gas flowing into the inside through the inlet.

In the fuel cell membrane humidifier according to the other embodiment of the present invention, the active blocking member may be made of a thermosensitive material capable of being compressed or expanded depending on the temperature of the wetting gas flowing into the inside through the inlet.

In the fuel cell membrane humidifier according to the other embodiment of the present invention, the active blocking member may be made of a metal material expanding in a first temperature range of the wetting gas flowing into the inside through the inlet and contracting in a second temperature range lower than the first temperature range.

In the fuel cell membrane humidifier according to the other embodiment of the present invention, the active blocking member may thermally expand in the first temperature range to partially block the bypass space and thermally contract in the second temperature range to partially open the bypass space.

In the fuel cell membrane humidifier according to the other embodiment of the present invention, the first temperature range may be a temperature range of the wetting gas flowing into the inside through the inlet in a first output range of the fuel cell stack, and the second temperature range may be a temperature range of the wetting gas flowing into the inside through the inlet in a second output range smaller than the first output range.

The fuel cell membrane humidifier according to the other embodiment of the present invention may further include a base member for fixing the active blocking member to the mid-case or the partition member.

Other specific matters of implementation examples according to various aspects of the present invention are included in the detailed description below.

Advantageous Effects

According to the present invention, it is possible to actively adjust a flow rate of an off-gas flowing into the inside from a fuel cell stack depending on an output situation of a fuel cell.

Further, according to the present invention, since a degree of opening of the bypass space is automatically adjusted depending on the temperature of the off-gas flowing into the inside from the fuel cell stack to the membrane humidifier, it is possible to drastically reduce the number of parts and an installation space required for bypass implementation.

MODE FOR DISCLOSURE

Since various changes may be made to the present invention, which may have several embodiments, specific embodiments will be illustrated and described in detail herein. However, it will be understood that this is not intended to limit the present invention to the specific embodiments, and all changes, equivalents, or substitutions included in the spirit and scope of the present invention are included.

The terms used herein are for the purpose of describing specific embodiments only and are not intended to limit the present invention. The singular forms "a," "an" and "the" include the plural forms, unless the context clearly indicates otherwise. It will be understood that the terms "comprises," "comprising," "includes" and/or "including," herein specify the presence of stated features, integers, steps, operations, elements, and/or components, but do not preclude the presence or addition of one or more other features, integers, steps, operations, elements, components, and/or groups thereof. Hereinafter, a fuel cell membrane humidifier according to embodiments of the present invention will be described with reference to the drawings.

Figure 2:
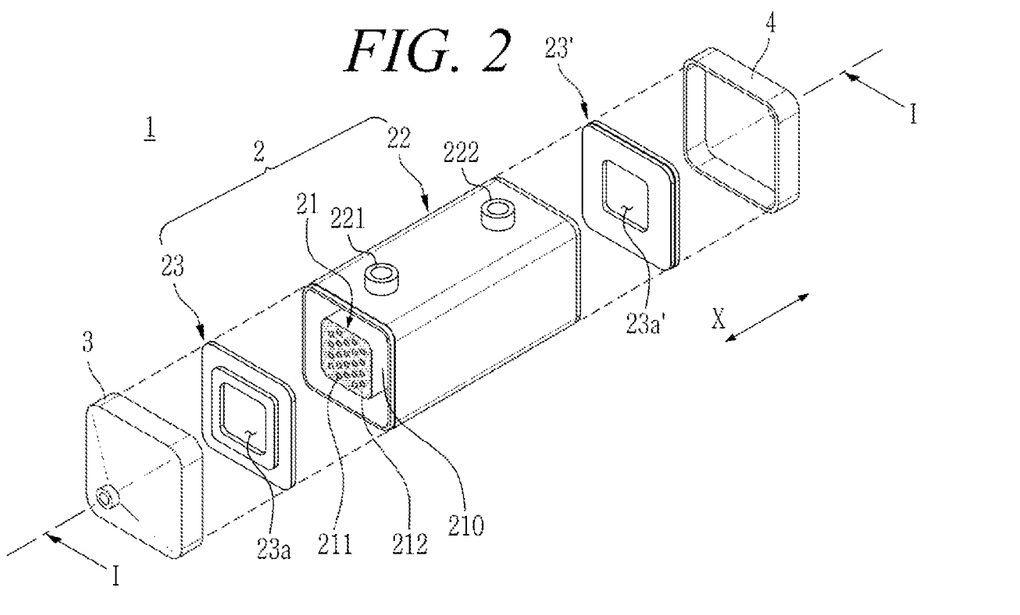
FIG. 2 is an exploded perspective view illustrating a fuel cell membrane humidifier according to the present invention.
Figure 3:
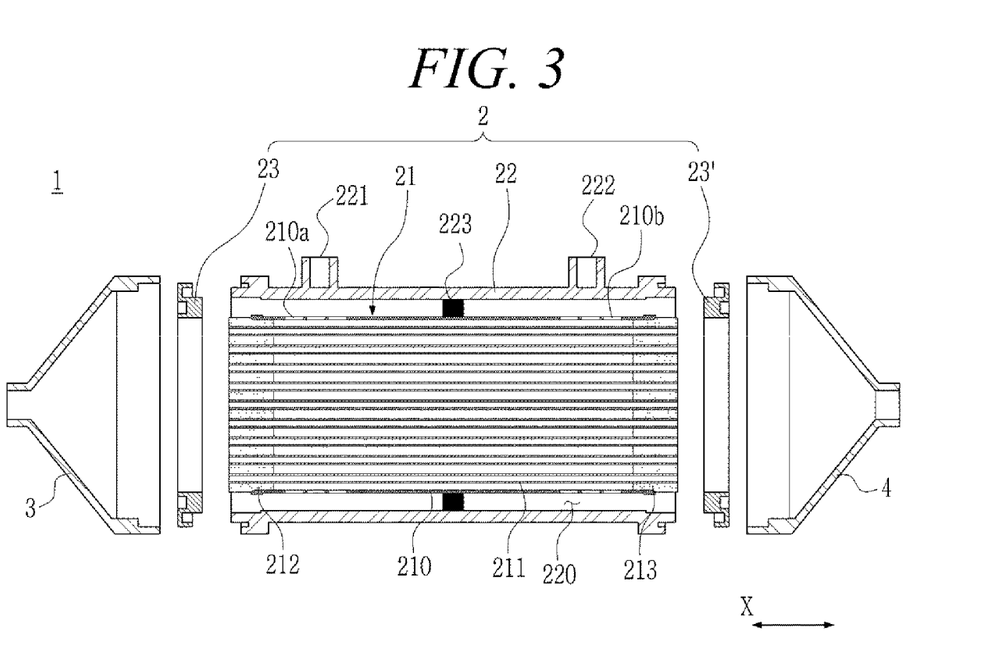
FIG. 3 is an exploded cross-sectional view of the fuel cell membrane humidifier according to the present invention taken along line I-I of FIG. 2.
Figure 4:
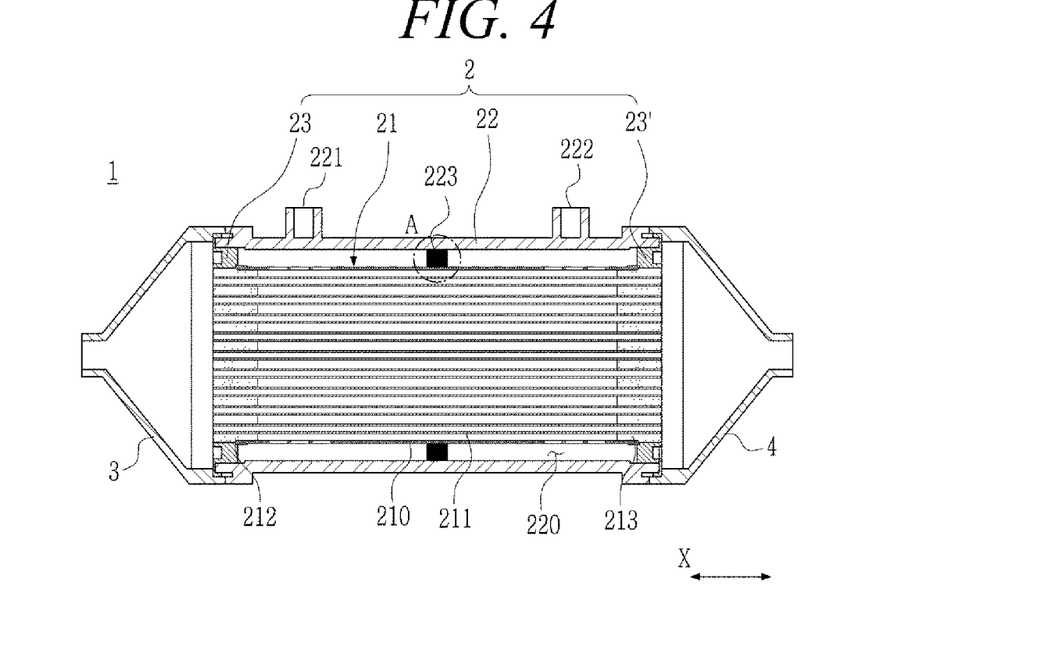
FIG. 4 is a combined cross-sectional view of the fuel cell membrane humidifier according to the present invention taken along the line II of FIG. 2.
Figure 5:
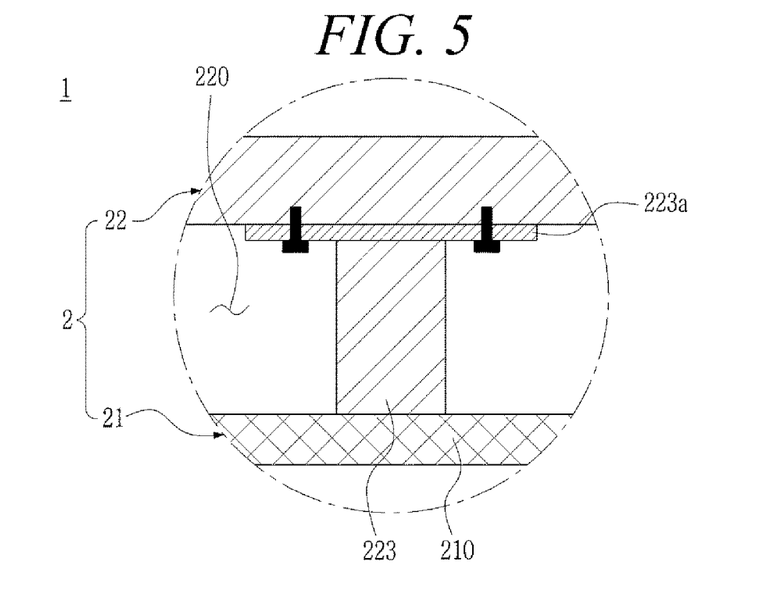
FIGS. 5 and 6 are enlarged cross-sectional views of a portion A of FIG. 4.
Figure 6:
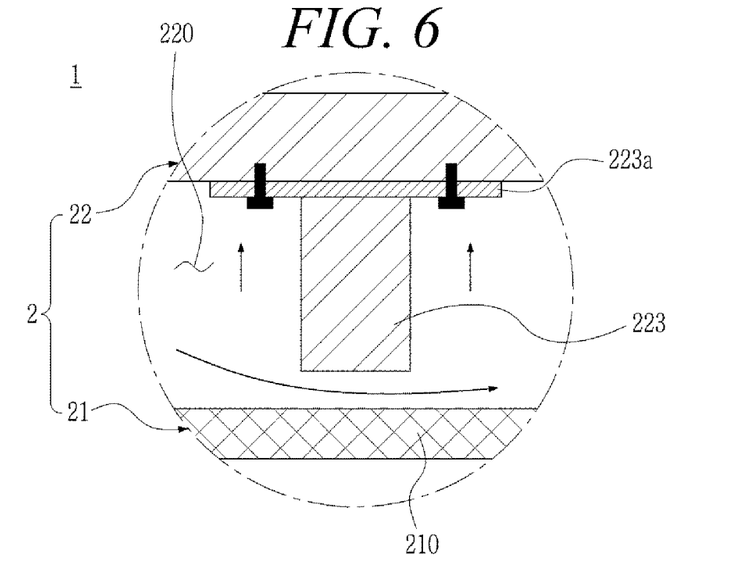

FIG. 2 is an exploded perspective view of a fuel cell membrane humidifier according to the present invention, FIG. 3 is an exploded cross-sectional view of the fuel cell membrane humidifier taken along line I-I of FIG. 2 according to the present invention, FIG. 4 is a combined cross-sectional view of the fuel cell membrane humidifier according to the present invention taken along line I-I in FIG. 2, and FIGS. 5 and 6 are enlarged cross-sectional views of a portion A in FIG. 4.

Referring to FIGS. 2 to 4, a fuel cell membrane humidifier 1 according to an embodiment of the present invention is intended to humidify a cell gas to be supplied to a fuel cell stack (not illustrated). The cell gas to be supplied to the fuel cell stack may be a fuel gas or air. The fuel cell membrane humidifier 1 according to the embodiment of the present invention includes a humidification module 2 for humidifying the cell gas, a first cap 3 coupled to one end of the humidification module 2, and a second cap 4 coupled to the other end of the humidification module 2.

The humidification module 2 humidifies the cell gas to be supplied to the fuel cell stack. The first cap 3 may be coupled to the one end of the humidification module 2. The second cap 4 may be coupled to the other end of the humidification module 2. The first cap 3 may transfer the cell gas supplied from the outside to the humidification module 2. The second cap 4 may transfer the cell gas humidified by the humidification module 2 to the fuel cell stack. The second cap 4 may transfer the cell gas supplied from the outside to the humidification module 2, and the first cap 3 may transfer the cell gas humidified by the humidification module 2 to the fuel cell stack.

The humidification module 2 includes a cartridge 21 and a mid-case 22.

The cartridge 21 includes a plurality of hollow fiber membranes 211. The hollow fiber membranes 211 may be implemented as the cartridge 21 and modularized. Accordingly, the hollow fiber membranes 211 may be installed inside the mid-case 22 through a process of coupling the cartridge 21 to the mid-case 22. Therefore, the fuel cell membrane humidifier 1 according to the embodiment of the present invention can improve the ease of work for installing, separating, and replacing the hollow fiber membranes 211.

The cartridge 21 may include an inner case 210 that accommodates the hollow fiber membranes 211. The hollow fiber membranes 211 may be disposed inside the inner case 210 and modularized. The hollow fiber membranes 211 may include a polymer membrane formed of a polysulfone resin, a polyethersulfone resin, a sulfonated polysulfone resin, a polyvinylidene fluoride (PVDF) resin, a polyacrylonitrile (PAN) resin, a polyimide resin, a polyamideimide resin, a polyesterimide resin, or a mixture of two or more of these.

The cartridge 21 may include a first potting portion 212. The first potting portion 212 fixes one side of each of the hollow fiber membranes 211. The first potting portion 212 may be formed not to block hollows of the hollow fiber membranes 211. The first potting portion 212 may be formed by curing a liquid resin such as a liquid polyurethane resin through a casting process. The first potting portion 212 may fix the inner case 210 and one side of each of the hollow fiber membranes 211.

The cartridge 21 may include a second potting portion 213. The second potting portion 213 fixes the other side of each of the hollow fiber membranes 211. The second potting portion 213 may be formed not to block the hollows of the hollow fiber membranes 211. This makes it possible for the cell gas to be supplied to the fuel cell stack to be supplied to the hollows of the hollow fiber membranes 211 without being hindered by the second potting portion 213 and the first potting portion 212, humidified, and supplied to the fuel cell stack. The second potting portion 213 may be formed by curing a liquid resin such as a liquid polyurethane resin through a casting process. The second potting portion 213 may fix the inner case 210 and the other side of each of the hollow fiber membranes 211.

The cartridge 21 is coupled to the mid-case 22. The cartridge 21 may be disposed inside the mid-case 22. The mid-case 22 may include a reception hole for accommodating the cartridge 21. The reception hole may be formed to pass through the mid-case 22 in a first axial direction (X-axis direction). The mid-case 22 may include an inlet 221 and an outlet 222. A wetting gas containing moisture may pass through the inside of the mid-case 22 through the inlet 221, be supplied to the inside of the inner case 210, and then come into contact with outer surfaces of the hollow fiber membranes 211. In this process, the moisture contained in the wetting gas may permeate the hollow fiber membranes 211 to humidify the cell gas flowing along the hollows of the hollow fiber membranes 211. The humidified cell gas may be discharged from the hollow fiber membranes 211 and then, be supplied to the fuel cell stack. After humidifying the cell gas, the wetting gas may be discharged to the outside of the inner case 210, pass through the inside of the mid-case 22, and then, be discharged to the outside of the mid-case 22 through the outlet 222. The inlet 221 may be connected to the fuel cell stack. In this case, the wetting gas may be an off-gas that is discharged from the fuel cell stack.

Meanwhile, an inlet hole 210a through which the wetting gas flows into the inside, and an outlet hole 210b through which the wetting gas humidifying the cell gas flowing along the hollows of the hollow fiber membranes 211 is discharged are formed in the inner case 210. In this case, the wetting gas may be supplied between an inner surface of the mid-case 22 and an outer surface of the cartridge 21 through the inlet 221, be supplied to the inside of the inner case 210 through the inlet hole 210a, come into contact with the outer surfaces of the hollow fiber membranes 211, humidify the cell gas flowing along the hollows of the hollow fiber membranes 211, be discharged between the inner surface of the mid-case 22 and the outer surface of the cartridge 21 through the outlet hole 210b, and be discharged to the outside of the mid-case 22 through the outlet 222. A plurality of inlet holes 210a may be formed in the inner case 210. The inlet holes 210a may be disposed to be spaced apart from each other in the first axial direction (X-axis direction). A plurality of outlet holes 210b may be formed in the inner case 210. The outlet holes 210b may be disposed to be spaced apart from each other in the first axial direction (the X-axis direction).

The humidification module 2 may include a plurality of packing members 23 and 23'. The packing members 23 and 23' seal a space between the cartridge 21 and the mid-case 22 to prevent the cell gas to be supplied to the fuel cell stack and the wetting gas supplied to the inside of the mid-case 22 from being directly mixed. The packing members 23 and 23' may be inserted between the cartridge 21 and the mid-case 22. In this case, the cartridge 21 may be inserted into first through-holes 23a and 23a' formed in the packing members 23 and 23'. The packing members 23 and 23' may be disposed on both sides of the cartridge 21. Although not illustrated, resin layers may be formed on both the sides of the cartridge 21 instead of the packing members 23 and 23'. The resin layers may be formed by curing a liquid polymer such as a liquid polyurethane resin through a casting scheme.

The first cap 3 is coupled to the one end of the humidification module 2. A space between the first cap 3 and the cartridge 21 may be sealed with respect to the space between the cartridge 21 and the mid-case 22 by the packing member 23 or the resin layer.

The second cap 4 is coupled to the other end of the humidification module 2. A space between the second cap 4 and the cartridge 21 may be sealed with respect to the space between the cartridge 21 and the mid-case 22 by the packing member 23' or the resin layer.

Meanwhile, in the fuel cell membrane humidifier of the related art, a partition wall that connects an inner wall of the mid-case 22 to an outer wall of the cartridge 21 is formed to prevent the wetting gas flowing into the inside through the inlet 221 from being directly discharged through the outlet 222 instead of flowing into the cartridge 21.

Meanwhile, an amount required for humidification of the wetting gas (hereinafter also referred to as an "off-gas") flowing into the inside from the fuel cell stack varies depending on an output of the fuel cell. That is, a large amount of humidification is required at high output, and a relatively small amount of humidification is required at low output.

In the related art, in order to adjust such an amount of humidification depending on an output situation, a separate bypass is installed outside a membrane humidifier, and a part of the wetting gas flowing through the inlet 221 is discharged to the outside. Therefore, in order to implement this, a bypass flow path connected to the outside should be installed separately on a flow path connecting the fuel cell stack to the inlet 221, a valve for discharging a part of the off-gas to the outside should be installed, and a control unit or the like that detects an output situation to adjust a degree of valve opening should be installed, and thus, there are problems such as an increase in the number of required parts and an increase in installation space due to the parts.

The embodiment of the present invention solves these problems of the related art with a simple structure, so that a reduction in a cost and installation space due to a reduction in the number of parts, miniaturization, and the like can be drastically realized.

To this end, the fuel cell membrane humidifier according to the embodiment of the present invention includes an active blocking member 223 that connects the inner wall of the mid-case 22 to the outer wall of the cartridge 21, as illustrated in FIGS. 3 and 4.

The active blocking member 223 is made of a thermo-sensitive material that can be compressed or expanded depending on a temperature (heat). The active blocking member 223 may be made of a metal material that expands at high temperature and contracts at low temperature. The high temperature may be defined as a first temperature range, and the low temperature may be defined as a second temperature range lower than the first temperature range.

The active blocking member 223 may thermally expand at high temperature to partially block a space between the mid-case 22 and the cartridge 21, and thermally contract at low temperature to partially open the space between the mid-case 22 and the cartridge 21 (hereinafter, a bypass space 220).

The off-gas flowing from the fuel cell stack to the fuel cell membrane humidifier 1 has a different temperature depending on the output situation. That is, the temperature of the off-gas is relatively high in the case of high output, and the temperature of the off-gas is relatively low in the case of low output. The high output may be defined as a first output range, and the low output may be defined as a second output range smaller than the first output range.

FIG. 5 illustrates a case of a high output situation, and FIG. 6 is a case of a low output situation. In FIGS. 5 and 6, reference sign 223a denotes a base member that may be used to fix the active blocking member 223 made of metal to the inner wall of the mid-case 22 made of plastic, but is not essential.

As in FIG. 5, in the case of a high output situation, the temperature of the off-gas is high, and a part of the off-gas flowing into the inside through the inlet 221 flows into the cartridge 21 through the inlet hole 210a of the inner case 210 and performs moisture exchange while flowing, and the remaining part transfers heat to the active blocking member 223 while flowing through the bypass space 220 between the mid-case 22 and the cartridge 21. The active blocking member 223 that absorbs heat from the off-gas thermally expands to block the bypass space 220 as illustrated in FIG. 5. Accordingly, a part of the off-gas that has not flowed into the inlet hole 210a is changed in direction by the active blocking member 223, flows into the cartridge 21 through the inlet hole 210a, and performs moisture exchange while flowing.

As in FIG. 6, in the case of a low output situation, the temperature of the off-gas is low, and a part of the off-gas flowing into the inside through the inlet 221 flows into the cartridge 21 through the inlet hole 210a of the inner case 210, and performs moisture exchange while flowing, but the remaining part absorbs heat of the active blocking member 223 while flowing through the bypass space 220. The active blocking member 223 deprived of heat by the off-gas thermally contracts to partially open the bypass space 220 as in FIG. 6. Accordingly, a part of the off-gas that has not flowed into the inlet hole 210a flows through the bypass space 220 through the open active blocking member 223, and then, is discharged to the outside of the mid-case 22 through the outlet 222

In the embodiment of the present invention, the active blocking member 223 suffices to be able to expand or contract to adjust a degree of opening of the bypass space 220 depending on the output situation, and does not have to completely block or completely open the bypass space 220.

According to the fuel cell membrane humidifier according to the embodiment of the present invention as described above, since the active blocking member 223 automatically adjusts the degree of opening of the bypass space 220 depending on the temperature of the off-gas flowing into the membrane humidifier from the fuel cell stack, it is possible to drastically reduce the number of parts and an installation space required for bypass implementation.

Figure 7:
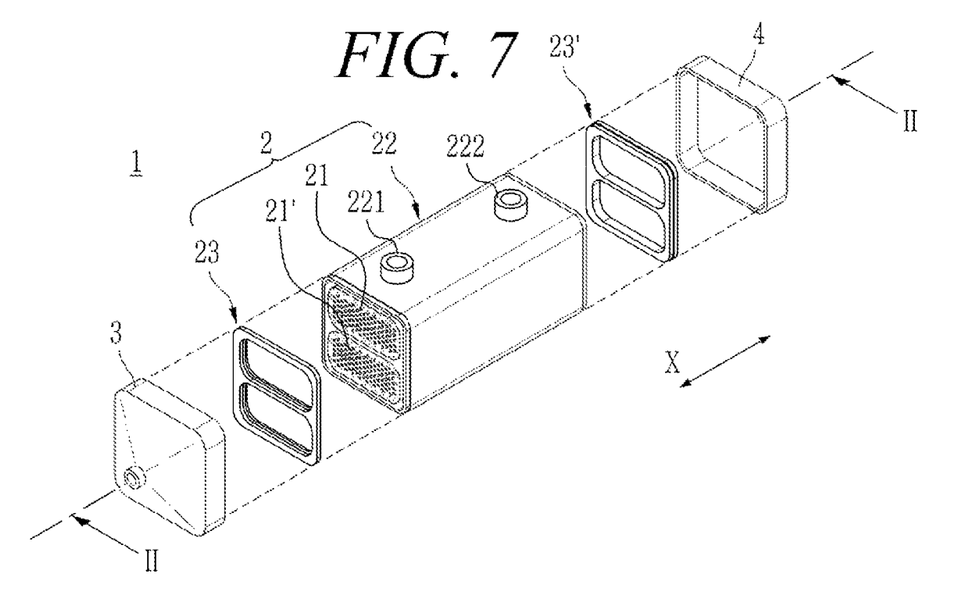
FIG. 7 is an exploded perspective view of an embodiment in which two cartridges are coupled to a mid-case in the fuel cell membrane humidifier according to the present invention.
Figure 8:
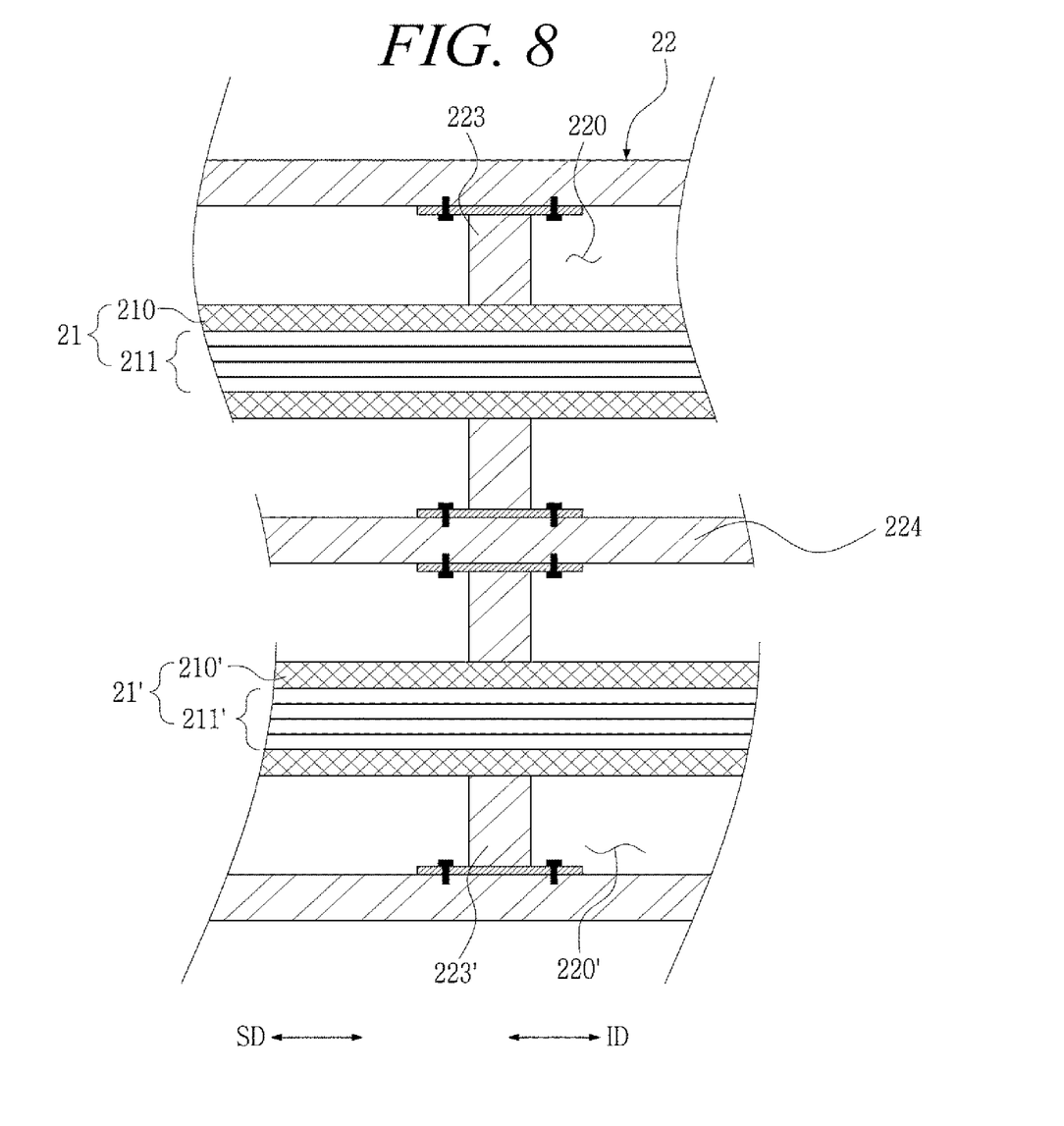
FIG. 8 is a partial cross-sectional view of the fuel cell membrane humidifier according to the present invention taken along line II-II of FIG. 7.

Referring to FIGS. 7 and 8, the fuel cell membrane humidifier 1 according to the present invention may be implemented such that a plurality of cartridges 21 and 21' are coupled to the mid-case 22. In this case, the mid-case 22 may include a plurality of accommodation holes for accommodating the cartridges 21 and 21', and the plurality of accommodation holes may be partitioned by a partition member 224. In addition, in this case, the bypass space 220 is formed not only between the mid-case 22 and the cartridge 21, but also between the partition member 224 and the cartridge 21, and the active blocking member 223 may be formed in at least one of a plurality of bypass spaces 220.

Figure 9:
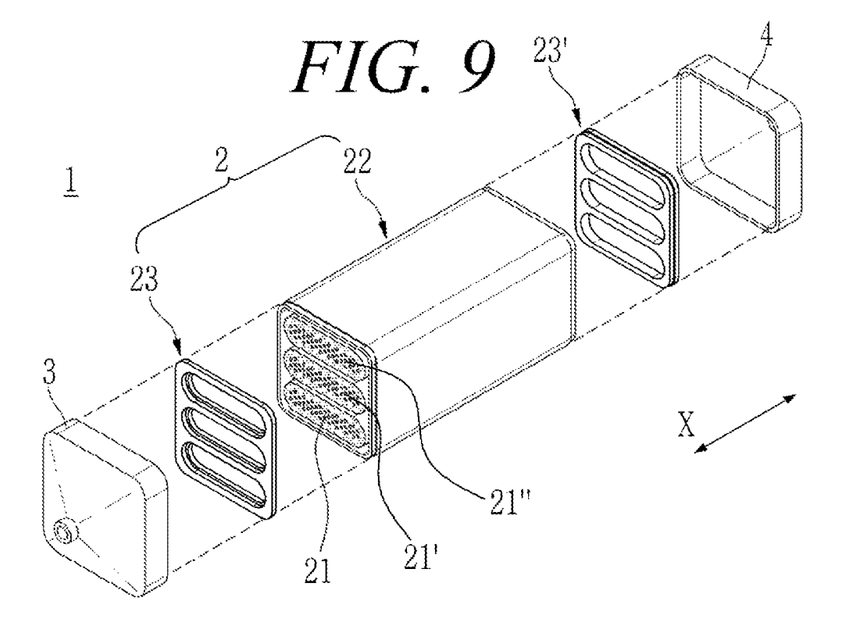
FIG. 9 is an exploded perspective view of an embodiment in which three cartridges are coupled to the mid-case in the fuel cell membrane humidifier according to the present invention.

In FIGS. 7 and 8, a case in which the two cartridges 21 and 21' are coupled to the mid-case 22 has been illustrated, but the present invention is not limited thereto and the fuel cell membrane humidifier 1 according to the present invention may be implemented such that three cartridges 21, 21', and 21" are coupled to the mid-case 22, as illustrated in FIG. 9. In addition, although not illustrated, the fuel cell membrane humidifier 1 according to the present invention may be implemented so that four or more cartridges 21 are coupled to the mid-case 22.

Although the embodiment of the present invention has been described above, those skilled in the art can variously modify or change the present invention through affixation, change, deletion, addition, or the like of components without departing from the spirit of the present invention described in the claims, and this will be said to be also included within the scope of the present invention.

The invention claimed is:

1. A fuel cell membrane humidifier comprising:
a mid-case including an inlet through which a wetting gas supplied from a fuel cell stack flows into the inside, and an outlet through which the wetting gas is discharged;
a cartridge disposed inside the mid-case and having a plurality of hollow fiber membranes accommodated therein;
a bypass space formed in a space between the mid-case and the cartridge; and
an active blocking member configured to adjust a degree of opening of the bypass space depending on a temperature of the wetting gas flowing into the inside through the inlet.

2. The fuel cell membrane humidifier of claim 1, wherein the active blocking member is made of a thermosensitive material capable of being compressed or expanded depending on the temperature of the wetting gas flowing into the inside through the inlet.

3. The fuel cell membrane humidifier of claim 1, wherein the active blocking member is made of a metal material expanding in a first temperature range of the wetting gas flowing into the inside through the inlet and contracting in a second temperature range lower than the first temperature range.

4. The fuel cell membrane humidifier of claim 3, wherein the active blocking member thermally expands in the first temperature range to partially block the bypass space and thermally contracts in the second temperature range to partially open the bypass space.

5. The fuel cell membrane humidifier of claim 3, wherein the first temperature range is a temperature range of the wetting gas flowing into the inside through the inlet in a first output range of the fuel cell stack, and the second temperature range is a temperature range of the wetting gas flowing into the inside through the inlet in a second output range smaller than the first output range.

6. The fuel cell membrane humidifier of claim 1, further comprising:
a base member for fixing the active blocking member to an inner wall of the mid-case.

7. A fuel cell membrane humidifier comprising:
a mid-case including an inlet through which a wetting gas supplied from a fuel cell stack flows into the inside, and an outlet through which the wetting gas is discharged, a plurality of accommodation holes partitioned by at least one partition member being formed in the mid-case;
a plurality of cartridges disposed in the plurality of accommodation holes and having a plurality of hollow fiber membranes accommodated therein;
a plurality of bypass spaces formed in a space between the mid-case and the cartridge and a space between the partition member and the cartridge; and
an active blocking member configured to adjust a degree of opening at least one of the plurality of bypass spaces depending on a temperature of the wetting gas flowing into the inside through the inlet.

8. The fuel cell membrane humidifier of claim 7, wherein the active blocking member is made of a thermosensitive material capable of being compressed or expanded depending on the temperature of the wetting gas flowing into the inside through the inlet.

9. The fuel cell membrane humidifier of claim 7, wherein the active blocking member is made of a metal material expanding in a first temperature range of the wetting gas flowing into the inside through the inlet and contracting in a second temperature range lower than the first temperature range.

10. The fuel cell membrane humidifier of claim 9, wherein the active blocking member thermally expands in the first temperature range to partially block the bypass space and thermally contracts in the second temperature range to partially open the bypass space.

11. The fuel cell membrane humidifier of claim 9, wherein the first temperature range is a temperature range of the wetting gas flowing into the inside through the inlet in a first output range of the fuel cell stack, and the second temperature range is a temperature range of the wetting gas flowing into the inside through the inlet in a second output range smaller than the first output range.

12. The fuel cell membrane humidifier of claim 7, further comprising:
a base member for fixing the active blocking member to the mid-case or the partition member.

* * * * *